Aug. 25, 1970  P. E. SCHUBERT  3,525,927
CONSTANT VOLTAGE AC POWER SUPPLY
Filed Oct. 28, 1968
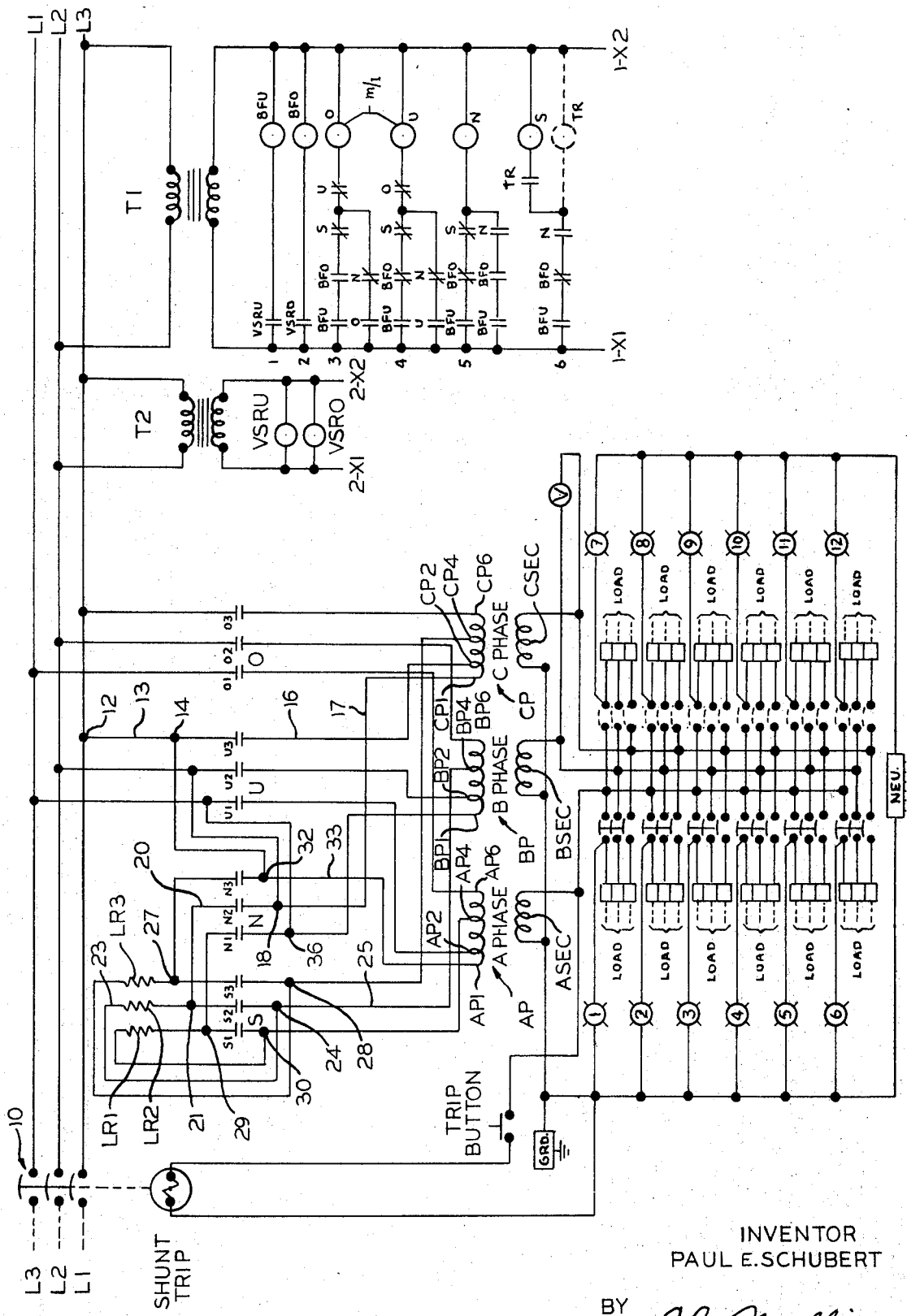
INVENTOR
PAUL E. SCHUBERT
BY
Eli Mullin
ATTORNEY

United States Patent Office 3,525,927
Patented Aug. 25, 1970

3,525,927
CONSTANT VOLTAGE AC POWER SUPPLY
Paul E. Schubert, Chicago, Ill., assignor to Cregier Electrical Mfg. Co., Chicago, Ill., a corporation of Illinois
Filed Oct. 28, 1968, Ser. No. 771,232
Int. Cl. G05f 1/14
U.S. Cl. 323—43.5        4 Claims

ABSTRACT OF THE DISCLOSURE

A three phase constant voltage power supply has individual transformers for the respective phases. A transformer has its primary winding tapped for voltage control to provide a predetermined constant output voltage over a range of primary input voltages. By switching tap connections, the output voltage of a transformer can be controlled. The corresponding taps on three primary windings are simultaneously switched and the switching is accomplished by the action of voltage sensing means operating from one phase. By means of various interlocking relay connections, the simultaneous switching in the three phases of various primary taps is attained to maintain a generally constant secondary output voltage. Load resistors are provided across certain contactors and such contactors are delayed during closing to prevent damaging arcs.

---

This invention relates to a constant voltage AC power supply and more particularly to a three phase power supply for maintaining, within substantial limits, a generally constant output voltage in spite of variations of load and/or input voltage.

While a system embodying the present invention has wide application, it is particularly useful in connection with power loads ranging from several kilowatts (kw.) up to as much as about 50 kw. There are many types of loads where the maintenance of constant output voltage within 5% limits is of paramount importance. As an example, computers require freedom from excessive voltage drops or rises to insure against the possibility of serious errors resulting therefrom. In many instances, the functional resolution of the computer on the tape used therewith is such that a change in tape speed will result in serious malfunction.

Another example involves the use of electro-medical equipment in connection with diagnostic or surgical procedure. Such equipment, in response to substantial changes in voltage, may function in a manner which could result in misleading technicians or doctors with disastrous consequences.

The above examples, as well as other instances where power at a generally constant voltage is required, has another important consideration. This is the necessity for having a constant voltage power supply in convenient form readily available without requiring elaborate electrical installation procedure with resultant time and expense. While constant voltage power supplies for light loads (loads less than about 100 watts) have been known and have been available for many years, the same is not true of power supplies operating at power levels in the kilowatt range.

As a rule, constant voltage has been provided by means of so-called constant voltage power transformers. Such power transformers generally provide two magnetic flux paths in shunt, one path linking the transformer winding and the other path being independent of the transformer winding. The ferro-magnetic cores in such transformers are so designed that a change in primary voltage affects the distribution of magnetic flux between both paths, the objective being to maintain a generally constant flux density in the portion of the magnetic circuit to which transformer windings are coupled. While such transformers are effective, they are expensive, are available in limited power ranges, are inefficient and can only be operated in the manner contemplated between relatively limited power levels. In contrast, a conventional transformer can be designed to operate efficiently over a wide range of power levels.

In accordance with the present invention, a three phase transformer system including primaries and secondaries is constructed in such manner that the primary windings are provided with three taps. Automatic switching equipment forming part of the new system effects connections between the main supply power system and appropriate primary taps on the transformers so that the secondary windings can have a substantially constant output voltage. A substantial feature of the present invention resides in the provision of simultaneous switching of all phases of the power supply system to the primaries of the transformers together with the inclusion of load resistors and contactor delay action.

A system embodying the present invention has a three phase power supply line for connection through suitable contactors to three transformer primaries connected in delta. The three transformer primaries are similar. Each primary winding has tapped connections for providing different voltage connections. As will be more fully set forth, the common terminal and tap terminal system from each transformer primary are connected through contactors to the three phase line. A feature of the present invention resides in the fact that a set of three contactors operated simultaneously from the same operating winding will establish simultaneously connections to the corresponding but similar taps on the three primary windings. The transformers themselves, insofar as magnetic cores are concerned, are of conventional construction for the particular power level desired and each phase has its own secondary with the three phase secondaries being connected in Y relation. An important feature of the present invention resides in the fact that voltage for sensing voltage conditions and controlling switching in the three phase power supply system is obtained from one phase only whereas the transformer ratios in each phase (due to the selection of the appropriate primary taps) is applied to the three phases simultaneously.

For a complete understanding of the invention, reference is now made to the accompanying drawing illustrating in diagrammatic form a system embodying the present invention.

Lines L–1, L–2 and L–3 are adapted to supply three phase alternating current, usually at 60 cycles, from a suitable source of power, usually comprising a public utility power system. Lines L–1, L–2 and L–3 have circuit breaker 10 of any desired construction for opening the main power line in the event of excessive power drain. Connected to line L–1 at junction point 12 is wire 13 going to junction point 14. Wire 13 continues beyond junction 14 to one terminal of contactor U–3 whose other terminal is connected by wire 16 to terminal CP2 of transformer primary CP. Transformer primary CP has common terminal CP1 to which is connected one end of the main body of primary winding CP. Primary winding CP has taps CP2 previously referred to, CP4 and CP6. As an example, assuming that three phase system L–1, L–2 and L–3 has 480 volts across any two terminals (in accordance with usual practice, this three phase system is grounded) then between terminals CP1 and CP4, a normal voltage of 480 is to be provided. Between CP4 and CP6 there are sufficient additional primary turns so that there will normally be a difference in voltage of about 24 volts (5% of 480 volts). The same voltage differences of 24 volts may be provided between CP4 and CP2 due to the location of tap CP2. Thus, if the line voltage happens to go to 504 (480 plus 5%), then primary CP should have terminals CP1 and CP6 connected to be supplied by phase C of the system. If the line voltage is normal 480, then the normal connections to terminals CP1 and CP4 of the primary should be established. If the line voltage is low, then terminals CP1 and CP2 will be active.

The selection of 24 volts as the differential is merely by way of example and will generally depend upon the characteristics of the load and of the power line energizing the power supply. It is understood that primary windings BP1 and AP1 connected to remaining phases B and A of the supply system will be similarly handled so that the three primaries are alike and are similarly connected.

Returning to primary CP, common terminal CP1 is connected by wire 17 to junction point 18 and through this junction point to one terminal of contactor N-2. The other terminal of contactor N-2 goes through wire 20 to junction point 21. Junction point 21 is connected to one terminal of load resistor LR-2, the other terminal of which is connected through wire 23 to junction point 24. Junction points 21 and 24 are connected to the terminals of contactor S-2. Junction point 24 is connected through wire 25 to tap BP4 of primary BP.

In a similar fashion, load resistor LR-3 is connected to junction points 27 and 28 across the terminals of contactor S-3. Load resistor LR-1 is connected to junction points 29 and 30 connected across contactor terminals S-1. Junction point 27 is connected through contactor terminals N-3 to junction point 32 which junction point is connected through junction point 14 to line wire L-1. Junction point 32 is also connected by wire 33 to terminal AP1 of primary winding AP.

The terminals of contactor N-1 are connected between junction points 29 and 36, the latter point being connected to common terminal BP1 of transformer primary BP.

Referring to the U series of contactors, the lower terminals of U-1 and U-2 are respectively connected to AP2 and BP2 taps on the A and B phases of the primary windings. The lower terminal of contactor U-3 is connected to terminal CP2 of the C phase primary. The upper terminals of the U series of contactors are connected respectively to junction points 36, 18 and 32. The O series of contactors have their lower terminals connected respectively to the No. 6 terminal of the A, B and C phases of the primary windings. The upper terminals of O-1, O-2 and O-3 contactors are connected to the L-1, L-2 and L-3 power lines. The S series of contactors are operated as a gang, closing and opening simultaneously. Similarly the N, U and O series of contactors are also operated as gang switches.

Voltage sensing is accomplished from lines L-2 and L-3. Transformer T-2 has its primary winding connected across L-2 and L-3 and its secondary winding connected to wires 2-X1 and 2-X2 going to voltage sensing relays VSRU and VSRO. These voltage sensing relays are preferably of the solid state type and are commercially available for operation at various voltage values. For example, T-2 can be a step down transformer with the secondary voltage being normally at 120 volts. Relay VSRU can pick-up (close) at 119 volts and drop out at 115 volts. Relay VSRO can pick-up at 125 volts and drop out at 121 volts.

These values are exemplary and will depend upon customer requirements, availability of particular relays. As a rule, the voltage differential for closing and opening can be adjusted. In the system disclosed here, normal or overvoltage conditions will cause relay operation. Undervoltage will result in both sensing relays being open, which condition itself will provide overall control action.

The actual power switching is accomplished from power provided by transformer T-1. This transformer has its primary winding also connected across L-2 and L-3. The secondary winding of T-1 is adapted to supply 120 volts under normal conditions to control wires 1-X1 and 1-X2.

The contact conditions are shown in the drawing. For example, sensing relay VSRU has its contacts VSRU connected in series with relay winding BFU across wires 1-X1 and 1-X2. The VSRU relay contacts are shown as normally open, this being indicated by the absence of a sloping line bridging the contacts as illustrated in other contact arrangements. The winding of BFU operates the three U contactors.

Correspondingly in the second circuit, normally open contacts VSRO are in series with relay winding BFO, this controlling the O series of contactors. The third control circuit is for the relay winding for controlling the O series of contactors. It will be seen that there is a series and parallel arrangement of relay contacts for obtaining the desired control action. For example, the normally open BFO relay contacts are associated with the BFO relay winding. When this winding is energized, then the BFO contacts are closed. Similarly BFU normally open contacts are operated by the relay winding of BFU. The S normally closed contacts are under the control of the winding of relay U. Similarly the remaining contacts in the entire control circuit have the letters of the contacts corresponding to the letters of the relay winding. The O relay controls overvoltage (when the line voltage in L-1, L-2 and L-3 becomes greater than 480). The U relay winding is energized when the line voltage is too low. The N relay winding controls the contact system when the line voltage is normal.

The winding for the O relay controls the O contacts as well as the three O1, O2 and O3 contactors in the O bank of contacts. The same is true for the U, N and S relays. The relay windings are shown as circles. The contacts carrying the same letter as a relay winding are operated by such relay winding. Referring to the lowest shunt circuit across 1-X1 and 1-X2, TR is a timing relay whose response time can be controlled. As an example, relay TR can close in about $\frac{1}{10}$ second after energization. Consequently, when TR closes, relay winding S is energized to close contactors S1, S2 and S3 making up the S bank of contactors. It has been found that providing load resistors of appropriate value across, S1, S2 and S3 greatly improves contactor action and eliminates arcing. The resistance values are not critical.

The resistors are similar for the three phases and the values are preferably a function of the current ratio of the power supply. A maximum IR drop across each load resistor up to about 20% of the supply voltage can be correlated for computer systems. With a 480 volt line, the IR drops across each load resistor can be as high as about 96 volts. Thus as an example, a 30 kw. power supply at 480 volts can have a load resistor of about 1.6 ohms. For lower power levels, the value of load resistor can be greater. In general, the value of load resistor may be determined by customer requirements.

Some load resistance is essential to avoid arcing. The load resistor is located across the contactors in the normal primary winding tap (here terminal 4) for applying normal line voltage to the primary windings. By having the load resistors located in the normal voltage tap circuit, it has been found that minimum contactor arcing occurs. The actual permissible IR drop across a load resistor may depart from the 20% given by way of example. Too low an IR drop is undesirable since excessively heavy currents may flow. Too great an IR drop appears to impair the regulating characteristic. A range of between about 15% and 25% of normal voltage is satisfactory, with a preferred value of about 20%.

It is necessary to prevent simultaneous overlap of relay response due to relay energization of the windings for the O and U relays controlling the O and U banks of contactors. This is accomplished by the contact arrangements in the third and fourth shunt control circuits going to the O and U relay windings. It is evident that the relay contact interconnection makes it impossible for both O and U relays to be energized simultaneously. However, both O and U relays may be and are simultaneously deenergized and, of course, may be independently energized.

Transformer secondaries ASEC, BSEC and CSEC are conventional to provide the desired output voltage. When connected in three phase Y, the output voltage for normal conditions will be substantially 208 volts with 120 volts across each phase. The common terminal of the three secondaries is grounded as illustrated while the high potential terminals of each secondary is connected through its own bus bar to provide any desired combination of output circuits. Each output circuit is preferably provided with an individual ciricut breaker.

As illustrated here, voltmeter V is connected between B and C phases. An emergency trip circuit is connected across phase A. This trip circuit includes a normally open Trip Button switch in series with a Shunt Trip winding, forming part of breaker 10 to open the breaker contacts upon closure of the Trip Button switch.

The operation of the system is as follows. A through metallic connection from each one of the three phase line wires L-1, L-2 and L-3 is provided to the common return terminal of each of the three transformer primary windings. Assuming that the line voltage is within normal range, voltage sensing relay VSRU will be closed. This will cause the winding of relay BFU to be energized. In the fifth shunt control circuit is relay winding N. The closure of relay BFU will result in relay winding N being energized and close the N bank of contacts. Tracing the circuit from line L-3, current can flow to junction point 36, through closed contactor N-1 to junction point 29. From junction point 29, the circuit continues through load resistor LR-1 down to junction point 30 and thence to normal voltage terminal AP-4 of the A phase transformer primary. From junction 36 voltage is also applied to common return terminal BP-1 of B phase primary winding. Corresponding circuits may be traced for L-1 and L-2.

The presence of load resistors across contacts of the S bank prevents excessive currents from flowing when they are opened. The energization of the N relay winding together with the energization of BFU relay winding results in energization of delay timing relay TR in the bottom shunt control circiut. Thus about ⅒ of a second after the N contact bank closes, the S contact bank is closed. Thus voltage from three phase power lines L-1, L-2 and L-3 is applied to the common return and normal voltage terminals of the three transformer primaries. As long as voltage remains normal in the power line supply system, relays VSRU; BFU; N and S remain closed.

If the line voltage rises above normal, relay VSRO closes. Relay VSRU remains closed so that both relays BFU and BFO are now energized. This causes the winding of relay O to be energized. The winding for relay N is de-energized. Due to the energization of BFO, the normally closed contacts of this relay in series with the S relay winding opens this winding of relay S and causes the S bank of contacts to open. Thus relays BFU; BFO and O and voltage sensing relays SRU and VSRO are all closed. The energization in the winding of relay O causes the O bank of contacts or switches to close and thus results in the application of line voltage across primary winding terminals 1 and 6 of each winding.

If the line voltage drops, sensing relay VSRO will drop out and de-energize BFO and return the system to normal transformer primary connections previously set forth. If the line voltage drops below normal, both VSRU and VSRO open for release and de-energize BFU and BFO relays. This will result in the fourth shunt control circuit becoming alive and energizing the winding of relay U. Thus the under voltage terminals of the transformer primaries are switched in to the power line.

Shunt control circuits 3, 4 and 5 for O, U and N relays are arranged with auxiliary shunt relay holding circuits so that proper operation of the system is insured.

By virtue of this arrangement, the S bank of contacts having resistors connected across these contactors function to insure arcless contactor operation. By appropriate choice of load resistor values, the voltage characteristics of the circuits to the transformer primary windings is maintained so that the secondary voltages are maintained substantially constant within the desired limits (in this case 5%). The interconnections between the N and S banks of contacts and the load resistors insures that desirable switching conditions will always exist. It has been found that this particular circuit arrangement is highly efficient. The three primary wnidings are delta connected for three phase operation. The three secondary windings are Y connected for single or three phase loads. The secondary windings may be delta connected if desired.

A system embodying the present invention for operation at substantial power levels up to as much as 50 kw. or greater may be assembled and mounted in a steel cabinet. Such a cabinet containing the transformers and complete control and load distribution fixtures may be pre-wired and transported to a desired location. A simple connection from three line wires to the input of the new power supply is easily and quickly established. Output connections to various loads at various times can be readily wired in metal conduit for permanent use or with line core for temporary use. In any event, the entire power supply may be easily and economically installed in a suitable location.

What is claimed is:

1. A three phase power supply for providing alternating current at desired voltage at kw. power levels, said supply comprising three similar power transformers, each transformer having a primary winding and a separate secondary winding, each primary winding having a common return terminal and three additional terminals for accommodating normal, over and under voltages, for energizing such primary winding, the over and under voltage margins, with respect to normal, being over 5%, current supply circuits between each primary winding terminal and each line of a delta connected three phase electric power supply system, the current supply circuits to the common primary winding return terminals being free of switches, the current supply circuits from the three system line wires to the three overvoltage primary winding terminals each including a switch in each phase between the line wire and terminal, means for operating such switches as a gang, the current supply circuits from the line wires of the system to the undervoltage primary winding terminals each including a switch in each phase, means for operating such three switches as a gang, a normal voltage supply circuit from each power line to the normal voltage primary winding terminal of each transformer, each such normal voltage supply circuit including two series connected switches, the first of such series connected switches being nearest to the power line and the second of such series connected switches being nearest to the normal voltage primary winding terminal, means for operating the first switches of the three phases as a third gang, means for operating the second of such switches of the three phases as a fourth gang, a load resistor connected across each switch in the fourth gang, voltage responsive means connected across two line wires of the three phase power supply system, operative relay means controlled by said voltage responsive means for selectively operating said gang switches to delta connect power line wires to overvoltage or undervoltage primary winding terminals in response to overvoltage or undervoltage conditions of said power line system, said connections providing for three phase delta energization of said three transformer primary windings from the three line wires of said power supply system, said operating relay means also including means for closing the contacts of said third gang in response to normal line voltage while said undervoltage and overvoltage primary winding terminals are open, and closing the contacts of said fourth gang after the closure of said third gang whereby satisfactory contact action is assured and means for connecting the secondary windings in Y relation to provide load circuits, said load circuits being adapted to be operated as separate or three phase loads.

2. The system according to claim 1 wherein each load resistor has a value that the IR drop across it is between about 15% and 25% of the voltage in the power supply system.

3. The system according to claim 2 wherein the voltage responsive means comprise two separate relays having normally open contacts, one such relay remaining closed at about normal voltage, the other such relay remaining closed over the permissible range of normal line voltage, said operating relay means being so interconnected with said two voltage sensing relays as to provide for undervoltage connections between the system line wires and the transformer primary windings when both of said voltage responsive relays are open.

4. The construction according to claim 2 wherein the load resistor has a value such that the IR drop across it is about 20%.

References Cited
UNITED STATES PATENTS

| | | | |
|---|---|---|---|
| 1,705,725 | 3/1929 | Farley | 323—43.5 |
| 3,255,403 | 6/1966 | Beaver et al. | 323—43.5 |
| 3,423,657 | 1/1969 | Ponstingl et al. | 323—43.5 X |

J D MILLER, Primary Examiner

A. D. PELLINEN, Assistant Examiner

U.S. Cl. X.R.

317—11